United States Patent [19]
Roths

[11] 3,719,158
[45] March 6, 1973

[54] TRANSPLANTING MACHINE
[76] Inventor: Herbert C. O. Roths, 316 Wilson Drive, St. Louis, Mich. 48880
[22] Filed: Feb. 14, 1968
[21] Appl. No.: 705,351

Related U.S. Application Data
[63] Continuation-in-part of Ser. No. 545,366, April 26, 1966, abandoned.

[52] U.S. Cl. .................................................... 111/2
[51] Int. Cl. ............................................. A01c 11/02
[58] Field of Search ........................... 111/1–3; 47/1; 171/61

[56] References Cited

UNITED STATES PATENTS 2,609,767   9/1952   Tapp et al. ................................ 111/3

FOREIGN PATENTS OR APPLICATIONS

78,162   2/1951   Norway
984,701   2/1951   France
169,919   7/1965   U.S.S.R.

*Primary Examiner*—Robert E. Bagwill
*Attorney*—Learman, Learman & McCulloch

[57] ABSTRACT

This invention relates to an automatic transplanting machine which is adapted to receive a plant-loaded magazine thereon. A pair of side-by-side convergent resilient endless belts which are provided to receive the plants from the plant-loaded magazine have a downward path of travel leading to a position adjacent the ground. The endless belts then diverge to release the plants.

11 Claims, 28 Drawing Figures

INVENTOR.
Herbert C.O. Roths.
BY Learman, Learman & McCulloch
ATTORNEYS

INVENTOR.
Herbert C.O. Roths.
BY Learman, Learman & McCulloch

ATTORNEYS

Fig. 26  Fig. 27  Fig. 28

TRANSPLANTING MACHINE

This application is a continuation-in-part of application Ser. No. 545,366, filed Apr. 26, 1966, now abandoned.

This invention relates to automatic transplanting machines for planting crops such as tomatoes, tobacco, celery, cabbage, onions and transplants of similar nature, and more particularly to a means and apparatus for feeding the transplants from a magazine or other carrier to a discharge or release station at the planting head which inserts the transplants into the ground in spaced apart relation as the machine is driven.

One of the prime objects of the invention is to design a transplant carrier formed with evenly spaced multicellular cavities for yieldably holding and moving transplants, without injury, to a given discharge position.

Another object of the invention is to provide a magazine formed of waterproof, flexible, belt material having a resilient strip on its upper face directly adjacent one edge thereof, which strip is formed with spaced apart transplant accommodating cavities or pockets in which the transplants are mounted and carried to the planting mechanism.

A further object is to provide a means for feeding the transplants into the transplanting head, including means for guiding and feeding said transplants into the ground without injury to the plants.

Still a further object is to design a transplant carrier so formed and shaped as to provide ample space for the roots and leaves of the transplants, which carrier is so formed that the root section of the transplants mounted in the magazine can, prior to usage, be placed in treated water of predetermined depth which provides rapid stimulation of the transplants when planted.

Another object is to provide simple, practical, and easily operable feed timing mechanism which is readily adjustable, and which feeds the magazine in accurate timed relation with the plant spacing in the row.

With the above and other objects in view, the present invention consists in the combination and arrangement of parts hereinafter more fully described, illustrated in the accompanying drawings, and more particularly pointed out in the appended claims; it being understood that changes may be made in the form, size, proportion and minor details of construction, without departing from the spirit or sacrificing any of the advantages of the invention.

The instant mechanism is directed broadly to automatic transplanters in which loaded magazines are mounted and the transplants are fed to planting belts and ground furrows, after which the individual transplants are watered and ground-packed in the furrow to complete the planting operation. As the magazine travels through the machine the spent section of the magazine is continuously wound on a rewind table as the transplants are fed to the planting means. A loader mechanism (not shown) is utilized for loading the transplants into the magazine, and is the subject matter of my co-pending application, Ser. No. 508,000, filed Nov. 12, 1965, now U.S. Pat. No. 3,492,786, these loaded magazines being mounted on the planting head of the machine and refilled when empty for continuous use over and over again.

Referring now more particularly to the drawings in which I have shown the preferred embodiment of my invention. The transplanting machine shown is designed to plant a single row of transplants and is intended to be drawn across the planting field in any suitable manner such as, for example, by means of a power operated tractor or other power source (not shown), and whereas the transplanter shown is designed as a single row machine, it should be clearly understood that it may be designed to plant a larger number of rows without departing from the spirit of the invention.

The planting feed drive assembly for my new planting machine comprises a horizontally disposed frame M upon which a water tank W is mounted in the conventional manner, said frame members projecting rearwardly beyond the tank W and are connected to the hubs 14 and 15 of a pair of tire equipped ground engaging wheels 16 and 17, respectively, the wheel 17 serving as the drive wheel to furnish power to the planting mechanism, and on a multiple row machine the wheel 16 is also used to drive the additional planting mechanism.

Vertically disposed spaced apart members 18 form a part of the main frame and are connected to provide a vertically disposed slotted passage 19 therebetween, and transversely disposed vertically adjustable members 20 span said frame with the ends slidably mounted in the passage 19 above referred to, and are secured in position by means of removable plates 21 or the like. The planting head H, the furrow opening shoe 22, and the packer wheel assemblies 23 raise and lower as a unit by means of a conventional hydraulic system, and in the instant design, two hydraulic, single-acting cylinders 24 are utilized, and by use of suitable hose and fittings 25 the system is connected to the hydraulic system (not shown) of a tractor. Vertically disposed clevis type rods 26 are attached to the cylinders 24 and the packer wheel adjusting arm 27, and these arms are connected to the lower head raising and lowering cross members 28 and 29. To connect the cross members 28 and 29, the master frame 30 is used to make them into a single unit, and the planting head clamps directly in position to the master frame 30. The upper and lower frame of the planting head drive assembly is attached by bolts (not shown), or the like, to the master frame and a horizontally disposed shaft 32 is journaled in bearings (not shown) provided thereon, said assembly being driven from a sprocket 34 which is mounted on said shaft 32 and by a chain 35 from the clutch assembly C.

A sprocket 36 is mounted on the hub 15 of the drive wheel 17, and a chain 37 drivingly connects said sprocket with a sprocket 38 which forms a part of the clutch assembly C which is adjustably mounted in a housing 39 provided on the frame M.

In practice, the clutch disengages as the planting head H is raising from its planting position, and this is accomplished by use of a conventional cam 40 which engages the clutch throw-out arm 41, and this throw-out arm is pivotally connected to the frame at 42. A drive sprocket 43 forms a part of the clutch assembly and is drivingly connected to the sprocket 34 of the planting head drive assembly, and inasmuch as the complete lifting frame raises and lowers as a unit, provision must be made to take care of excess drive chain, and I therefore provide an idler sprocket 44 and a chain idler 45 which is tensioned by means of a spring 46. When engaged, the chain 35 leads from sprocket 43 over idler sprocket 44, thence sprocket 34 and chain idler 45 to clutch, and it will be obvious that this clutch assembly is driven from the drive wheel 17. Spaced apart sprockets 49 and 50 are mounted on the shaft 32 and are drivingly connected to planting head sprockets 51 provided on shafts 52 by means of chains as usual. The planting head is thus driven by two chains and sprockets which provide positive drive for each individual planting belt 54.

An intermediate sprocket drive assembly 55 forms a part of the feed drive mechanism and includes a sprocket 56 drivingly connected to s sprocket 57 provided on the feed drive assembly by chain 58, and these sprockets, used in the feed drive chain, are of different diameters so that when they are interchanged two different speed ratios can be obtained.

Figure 15:
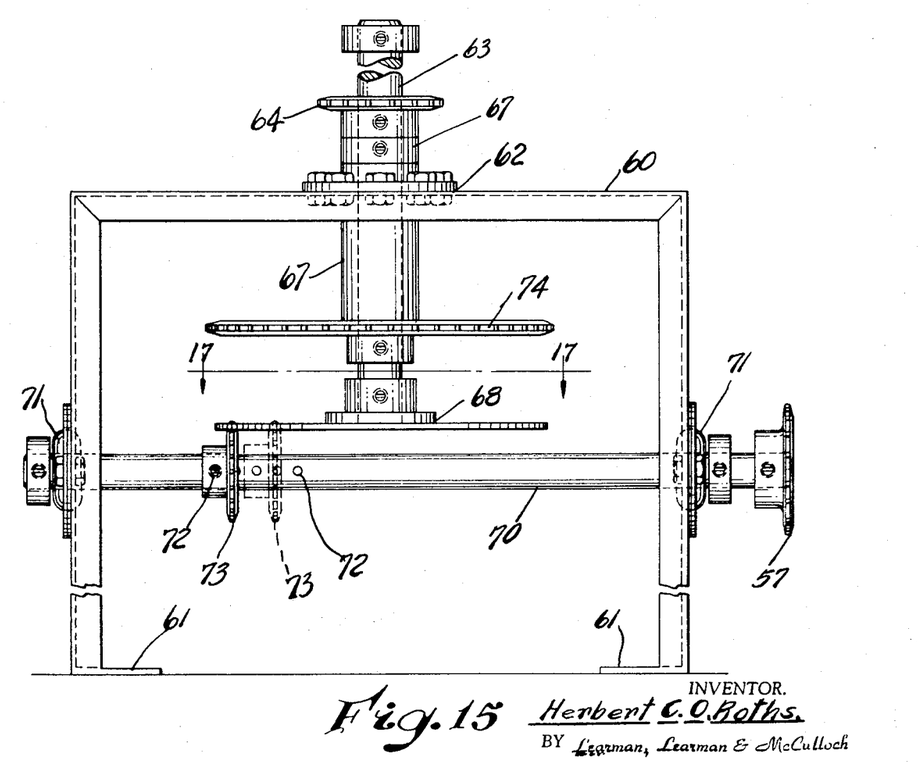
FIG. 15 is a transverse detailed view showing the feed timing plate assembly frame, vertical and cross feed shafts, the broken lines showing the drive gear in adjusted position.
Figure 16:
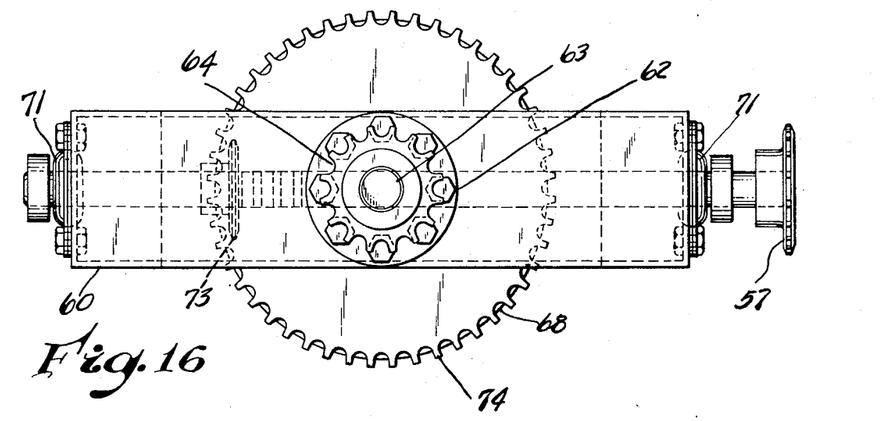
FIG. 16 is a top plan view thereof.

A vertically disposed frame 60 spans the main frame M and is formed with flanges 61 for securing it in position, and a bearing holder 62 is mounted on frame 60 and accommodates a vertical drive shaft 63. A sprocket 64 is mounted on the drive shaft 63, said sprocket being drivingly connected to sprocket 65 provided on the magazine roll feed assembly 66, and collars 67 are provided on said shaft for securing the parts in position. A feed timing plate and hub assembly 68 is provided on the lower end of the shaft 63, (see FIG. 15 of the drawings), said timing plate having a series of openings 69 of various diameters therein and for a purpose to be presently described. A horizontally disposed cross-feed shaft 70 spans the vertical frame 60 and is mounted in flangettes 71, and a plurality of spaced apart openings 72 are provided at one end of the shaft 70 to provide for adjustment of a gear 73, the teeth of which engage with the selected openings 69 in the special timing plate to provide various speeds of the sprocket adjusted with relation to the plate.

The sprocket 57 is mounted on the opposite end of cross shaft 70 and the chain 58 drivingly connects the sprockets 56 and 57. A large sprocket 74 is mounted on shaft 63 and a chain 75 drivingly connects sprocket 74 with sprocket 76 provided on the magazine roll feed assembly 77.

From the feed drive shaft 63 and sprocket 64 power is transmitted through the drive chain 78 and sprockets 79 to the magazine roll feed assembly 66 which is connected to the magazine conveyor assembly 82. The feed roll diameters in the magazine roll feed assembly is such that at proper time the transplant is released from the magazine and is transferred to the planting belts 54.

Figure 25:
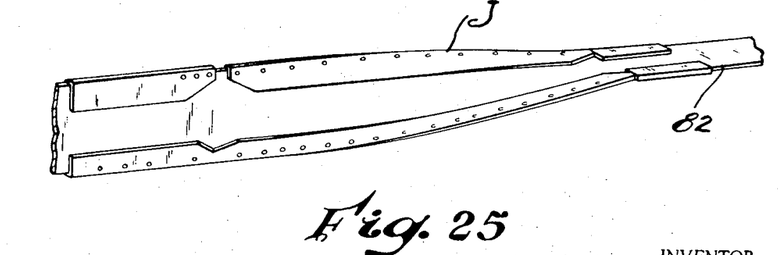
FIG. 25 is a fragmentary perspective view of the conveyor.

A transplant conveyor J is mounted on the right hand side of the transplanter head on the support 81 and is vertically adjustable to provide the depth desired to plant the transplants D in the ground. The conveyor is preferably formed of a flat strip 82 having metal strips 83 secured to the opposite side edges thereof by means of screws 84 or the like, the strips 83 being formed with inwardly projecting legs 85 overhanging the edges of the flat strip 82 and forming guides for the magazine. This strip assembly is of predetermined length and is shaped to provide a smooth continuous one-half convolute twist so that, in practice, the one end lies flat on the support, thence it extends forwardly following the twist of the conveyor J until the opposite end of the conveyor rests on edge. (See FIG. 25 of the drawings.) When a loaded magazine S is placed in position on the frame, the leading end, with no transplants therein, is first threaded through the conveyor J and around the feed and opening roll 87, thence leading over idler roller 88 and being anchored to the spool S on rewind table R to be wound thereon as the machine is driven.

Figures 1, 17:
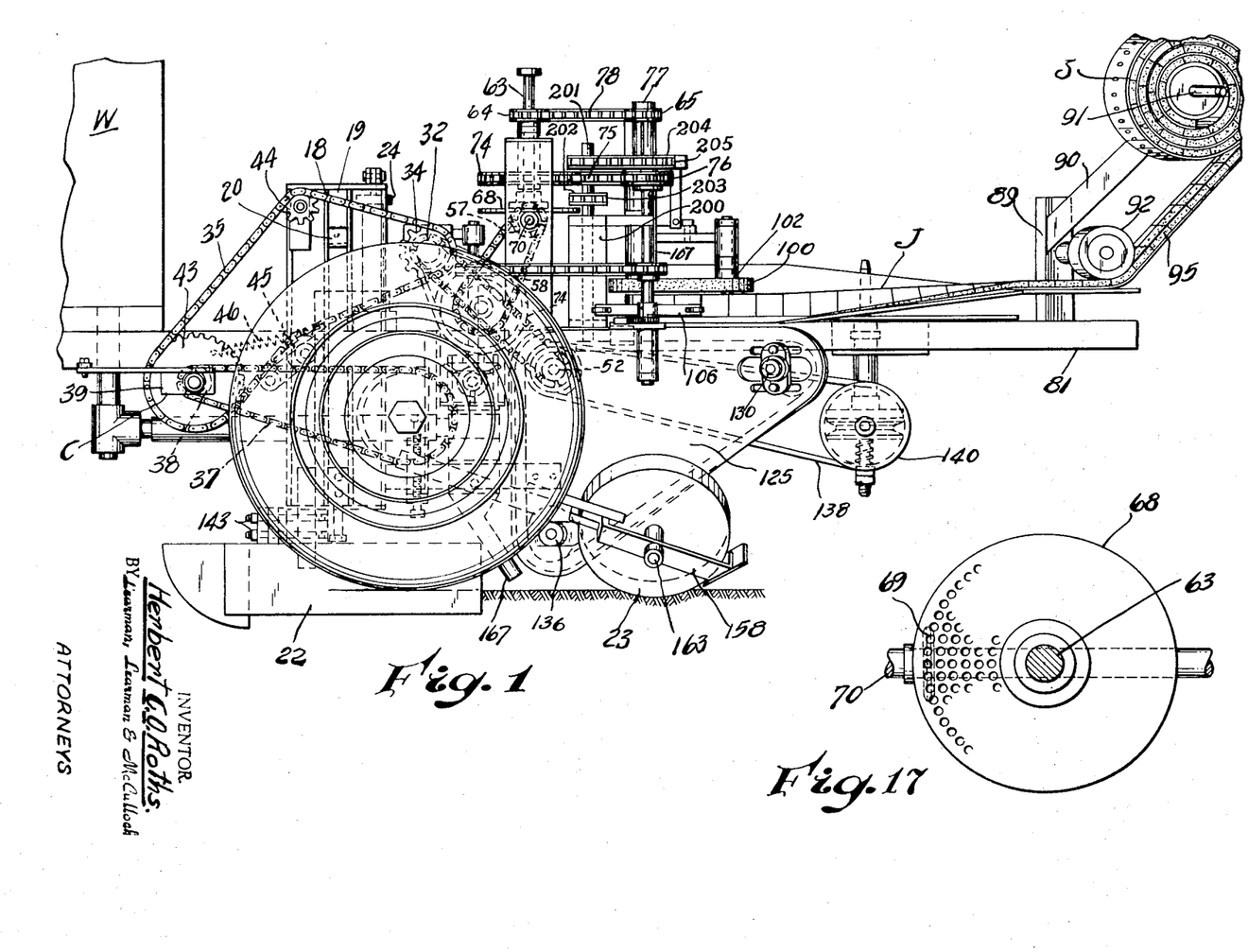
FIG. 1 is a side elevational view of the transplant planting machine.
FIG. 17 is an enlarged sectional plan view of the timing plate taken on the line 17—17 of FIG. 15.
Figures 2, 12, 13:
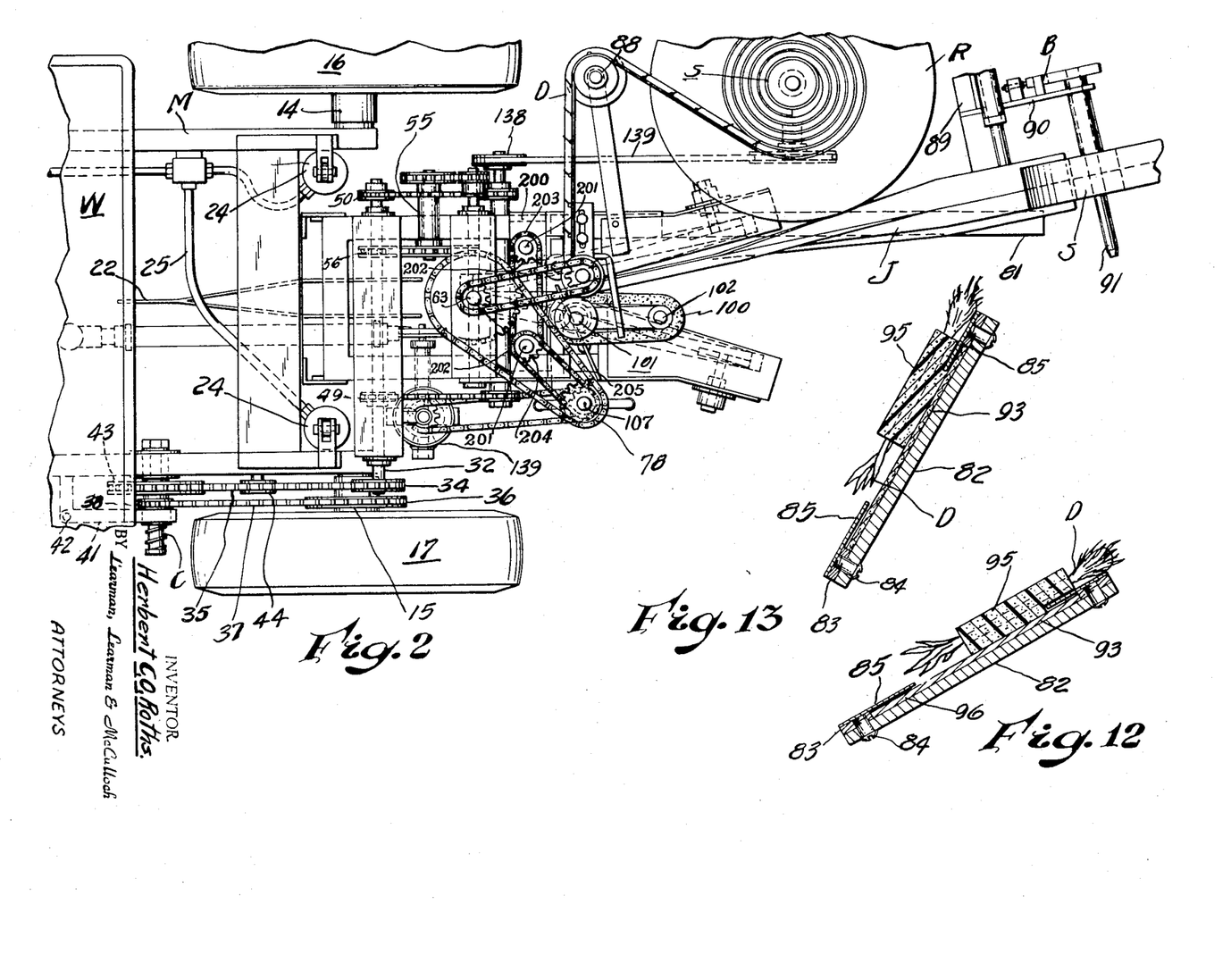
FIG. 2 is a top plan view thereof.
FIG. 12 is an enlarged, transverse sectional view through the magazine and conveyor taken on line 12—12 of FIG. 8 and showing a transplant in position.
FIG. 13 is a view similar to FIG. 12 taken on line 13—13 of FIG. 8.
Figures 3, 4, 5, 6, 7:
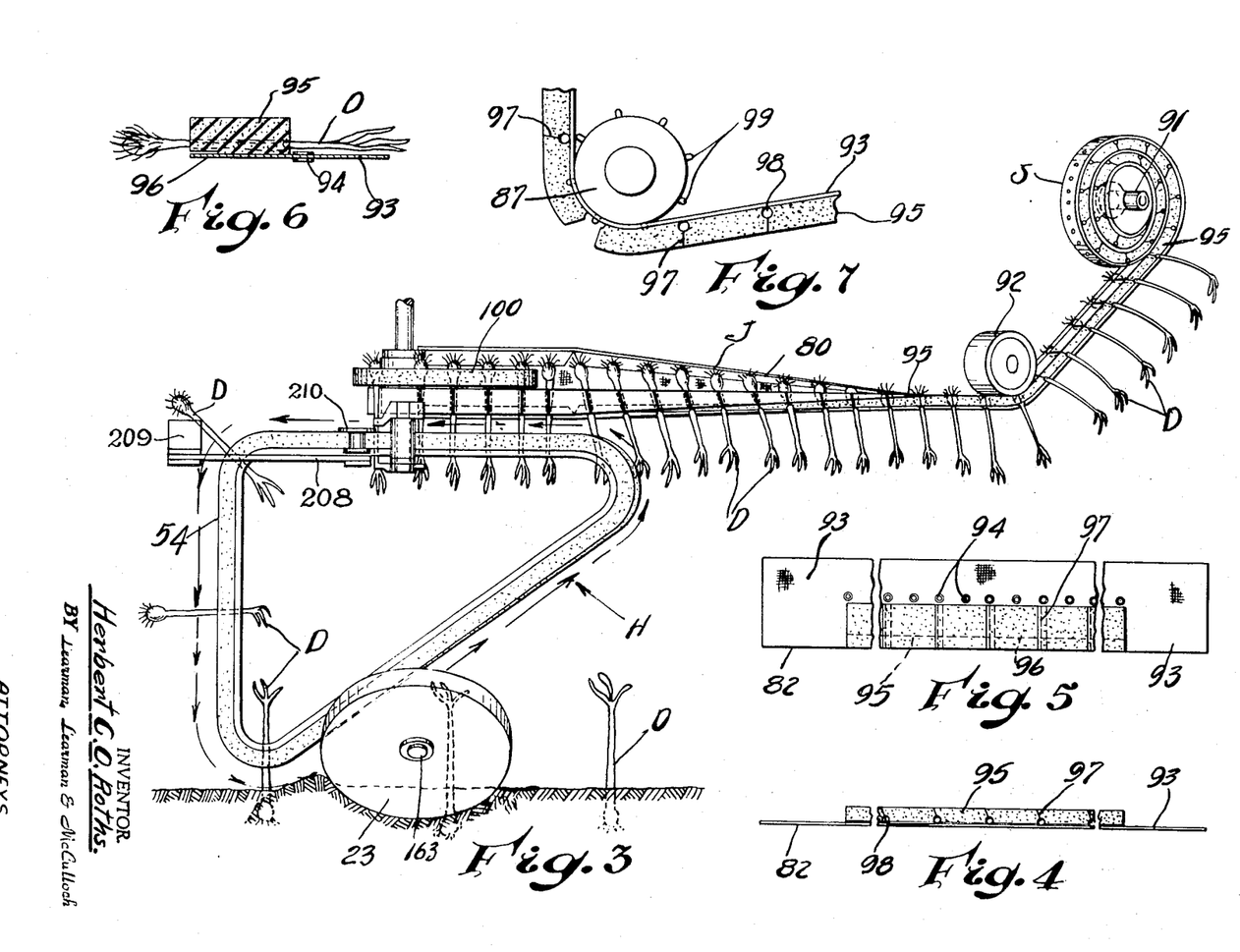
FIG. 3 is a schematic side elevational view showing the magazine, spool, conveyor, holding belt and planting head, and showing the course of travel of the transplants from the loading station to the planting head.
FIG. 4 is a fragmentary edge elevational view of the magazine belt.
FIG. 5 is a top plan view thereof.
FIG. 6 is an enlarged transverse sectional view through the magazine belt with a transplant in position therein.
FIG. 7 is an enlarged fragmentary plan view of the magazine belt and actuating roller.

A vertically disposed support 89 is provided adjacent the one end of the conveyor assembly and an angularly disposed brace 90 extends therefrom and supports a horizontally disposed shaft 91 on which a spool S with magazine belt wound thereon is mounted. A conventional brake B is mounted on the shaft 91 and is adjustable to prevent excessive unwinding of the loaded section of the transplant carrier as the machine is driven. An idler roller 92 is mounted on the support 89 and is mounted to rotate on the exposed face of the magazine belt as it is being unwound, and it will be obvious that the transplants in the roll will remain horizontally disposed (see FIG. 3 of the drawings) until they reach the point of entry to the convolute section of the conveyor, then further travel through the conveyor J causes the transplants to gradually assume an inverted vertical position. (See FIGS. 12 and 13.)

Figure 18:
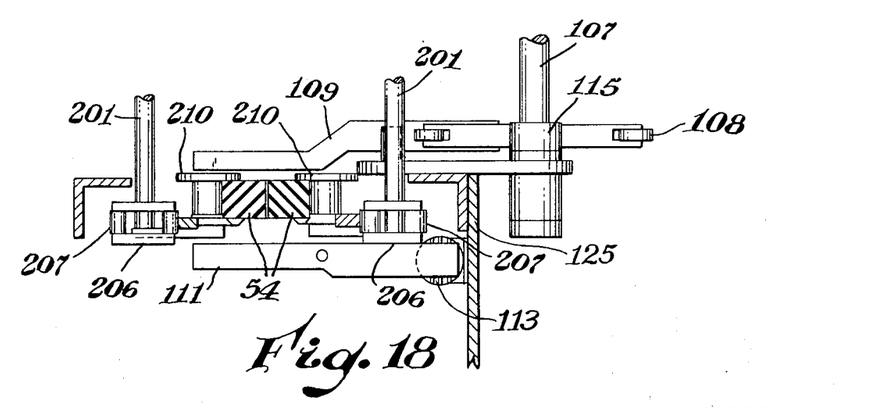
FIG. 18 is a part sectional edge elevational view of the plant release mechanism.

The magazine (FIGS. 4 and 5) comprises a relatively thin fabric section 93, having an exposed linear row of spaced apart openings 94 provided therein, and a continuous strip of sponge rubber 95, or blocks thereof (not shown), of predetermined width, is secured to the upper face of the belt adjacent one edge thereof but does not cover openings 94; however, the outer lower edge section 96 of the strip is not secured to the fabric belt because it slidably accommodates the thin metal leg 85 secured to the face of the conveyor to accurately support and guide the magazine belt as the machine is operated. The belt is formed with spaced apart slits 97 terminating in enlarged pocket openings 98 in which the transplants are carried, and the special feed and opening roll 87, of correct diameter, is provided to properly open the pockets 98 to release the transplant at the proper timing. This feed and opening roll 87 is provided with evenly spaced teeth 99, which spacing matches the openings 94 in the fabric section of the magazine to provide proper transplant feeding as the feed roll rotates, and due to its cylindrical design and angular change in the direction the magazine travels, the pocket slits 97, which hold the transplant in the magazine, opens to release the transplant at timed intervals with the plant release mechanism, (see FIGS. 18 and 19 of the drawings). The transplants are individually released as the magazine travels around the geared feed roll 87, thence the magazine leads to and is wound on the rewind spool R as the transplants are released from the magazine. A holding belt assembly 100 is provided directly adjacent the inner end of the conveyor J and includes a vertical shaft 101 provided with a yoke 102 on the lower end thereof, including spaced apart pulleys 103 on which the sponge rubber holding belt 100 is mounted. The roll feed shaft 66 on which the roll feed pulley 87 is mounted is located directly adjacent the shaft 101 and these shafts are drivingly connected by means of intermeshing gears 104 and 105 and travel at the same speed, the sponge rubber holding belt bearing on the traveling magazine and preventing the transplants from dropping or slipping as they are ejected from the magazine. This holding belt 100 is driven in the same direction and at the same speed as the magazine travels by action of the intermeshing gears 104 and 105, and provides yieldable resilient facial contact with the magazine and holds the transplants in proper position. This assembly is mounted to provide a wide range of easy adjustment between the holding belt and the magazine.

A plant release mechanism is mounted on the frame of the planting head and is driven from the vertical feed drive shaft 107, said mechanism holding each plant in accurate position until completely released from the magazine belt, and in order to provide the proper speed ratio between the plant release mechanism and the feed and opening roll 87 the drive sprocket from the feed drive assembly to the plant release mechanism has a ratio increase of two to one. When a transplant is being released from the magazine by the feed and opening roll 87 (see FIG. 7 of the drawings) it is held in the proper position by the holding belt 100, then as the plant is released by the radial arm, one roller 108 contacts plant release finger 109. A lower release finger 111 is also mounted on bearing assembly 110 below the planting belts 54, and these fingers 109 and 111 act as a damper and prevent any portion of the transplant from entering the planting belts until the plant is released from the feed and holding belt. A spring 112 is connected to the lower release finger 111 at the point 112' and to a suitable anchor 112'' to return the complete finger assembly to original position. After the release arm 106 leaves the opening and dwell section of the release finger, it engages a cushion 113 which is attached to the planting head side plate 125 to cushion the return, and radial adjustment of the release arms 106 is obtained by set screws (not shown) in the hub collar 115. Rotation of the shaft 107 times the withdrawal pivoting of the release fingers 109 and 111 fixed on pivot shaft 110 and releases the transplant at the proper time.

Planting belt opening and closing mechanism is secured to the top of the planting head framework and is driven by a sprocket 204 and a chain 205 from the shaft 107. The opening and closing mechanism includes a pair of driven shafts 201 mounted outboard of the belts 54 and driven by sprockets 202 mounted on the upper ends of shafts 201, a chain 203 being provided to revolve the two shafts 201 at equal speed. On the lower end of each of the two shafts 201 double roller cam actuator assemblies 206 (FIGS. 8 and 18) are attached. Each cam roller actuator assembly 206 includes vertically spaced guide plates fixed to one of the shafts 201 which mount rollers 207.

Figures 8, 9, 10, 11:
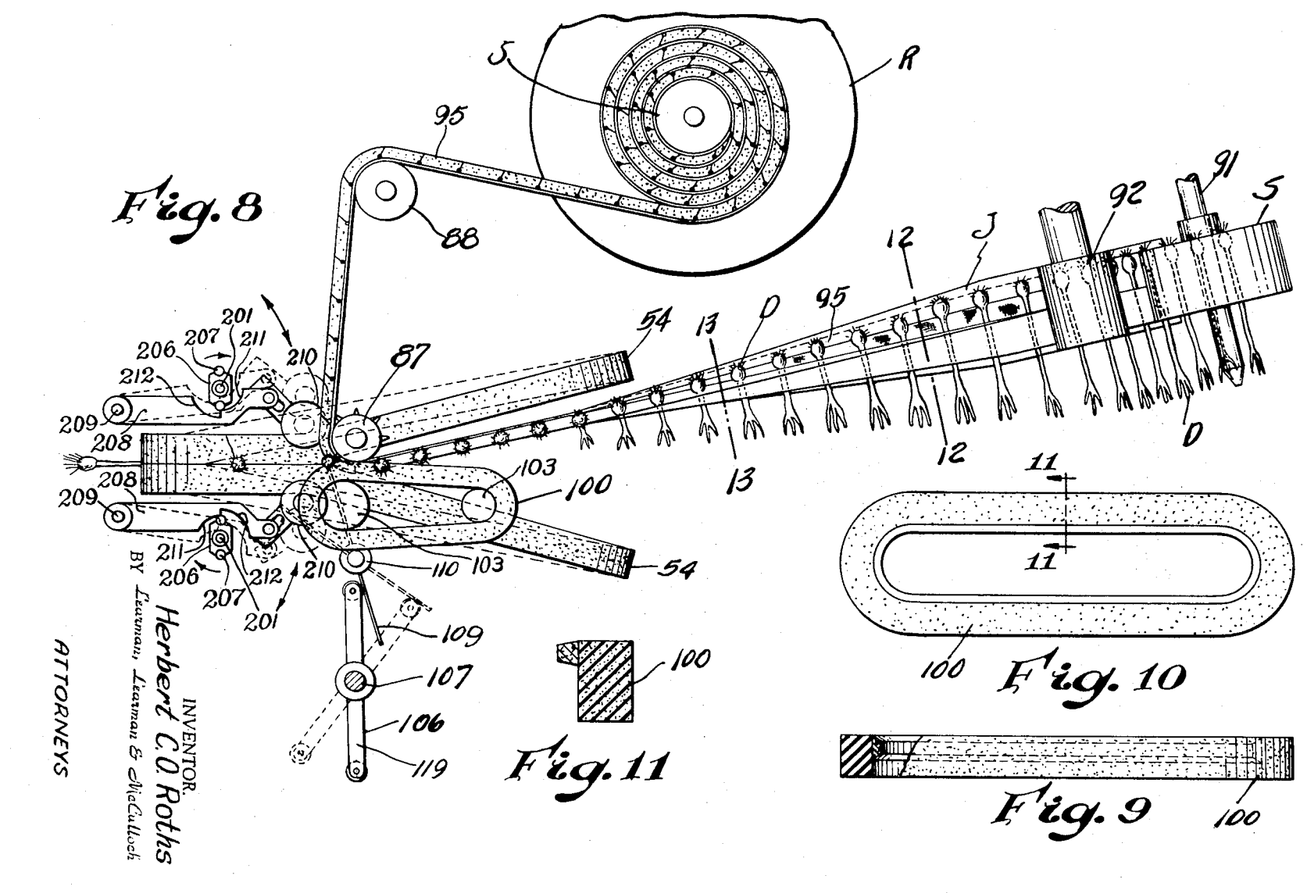
FIG. 8 is also a schematic top plan view of the magazine belt, conveyor, the planting head, and holding belt, showing also the coiling of the spent magazine after the transplants are individually ejected from said magazine.
FIG. 9 is an enlarged side elevational view of the transplant holding belt, a section being broken away to show the construction.
FIG. 10 is a top plan view thereof.
FIG. 11 is a transverse sectional view taken on the line 11—11 of FIG. 10.
Figure 14:
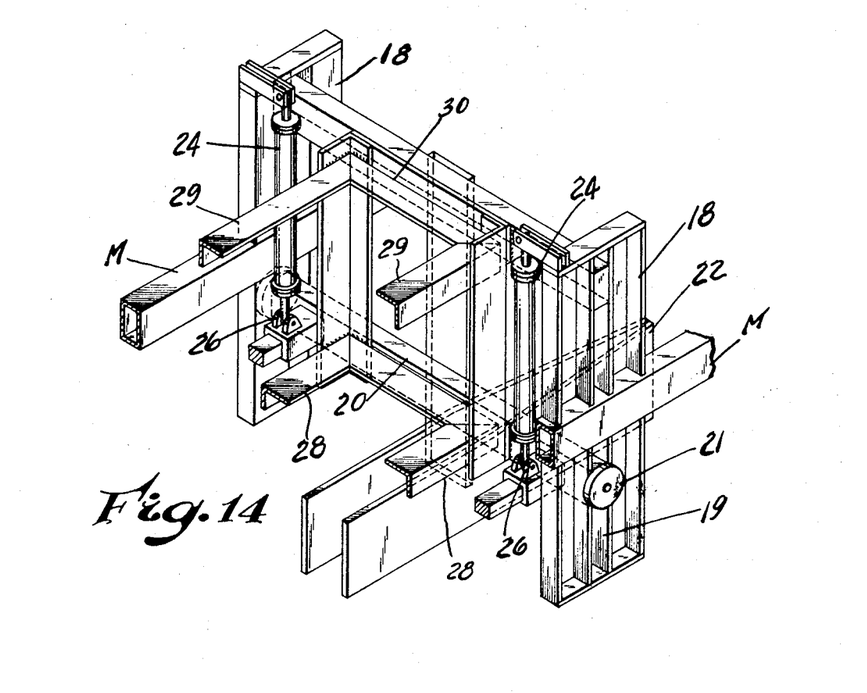
FIG. 14 is a fragmentary isometric view showing the hydraulic members and the head raising and lowering cross members.
Figure 19:
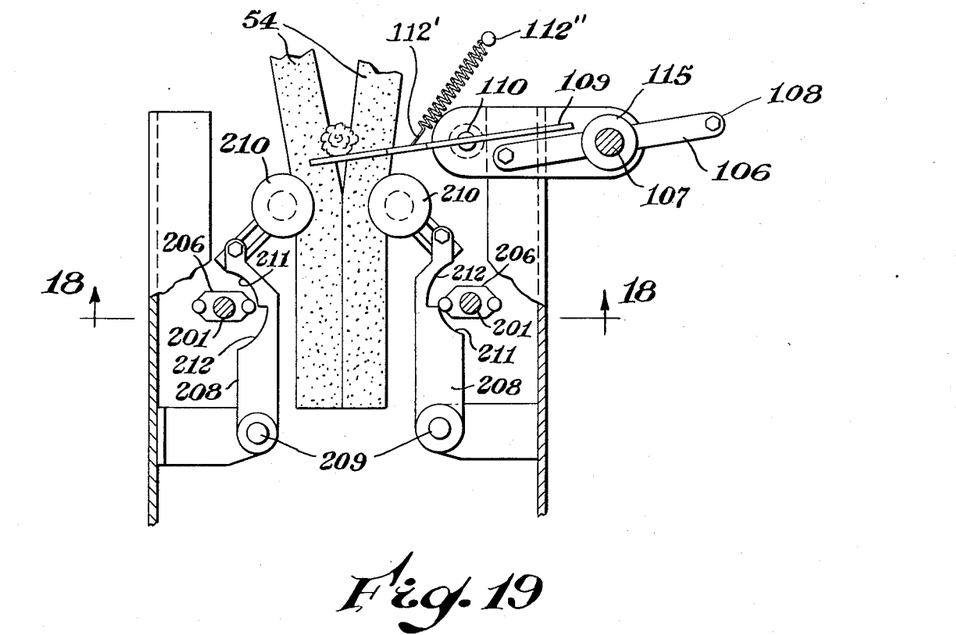
FIG. 19 is a top plan view thereof.

Extending alongside each belt 54 is a lever 208 pivotally mounted on a bracket attached to the top framework of the planting head for lateral oscillation about pivot pins 209. On the opposite end of the levers 208 belt engaging guide pulleys 210 are rotatably mounted for moving the planting belts 54 toward one another as shown in FIGS. 8 and 19 to close them or engage them for a greater portion of their length. Provided on the levers 208 are cam surfaces 211 which are engaged by rollers 207 to close the levers 208. The portions 212 are relieved to permit the belts 54 to simultaneously naturally spread to a more open position in the sense that a lesser portion of the horizontal runs of belts 54 is engaged.

Each guide pulley assembly 210 is adjustably fixed to a slotted bar which is fixed to a lever 208, and permits the guide pulley 210 to be mounted in the desired position to obtain the proper Vee for large or small size plants in the soft rubber planting belts 54.

In operation, the cam roller actuator assemblies 206 are continuously rotated by the shaft, as previously explained.

The cam actuator rollers 207 alternately engage the cam surfaces 211 and simultaneously close the levers 208 which changes the location of the opening Vee formed in the planting belts 54 relative to the magazine feed opening roll 87. Then as the shafts 201 continue their revolution the levers 208 are permitted to spring outwardly until the surfaces 212 engage the rollers 207. This moves the Vee formed between the planting belts 54 forwardly and has the effect of preventing any extended leaves on a following plant from entering the planting belts 54 before the belts 54 should receive it. Because of this no more than one plant should be received at a time by belts 54.

The levers 208 in effect permit the machine to maintain control of the plants and tend to prevent doubles from occuring. Thus, when the machine is properly adjusted, only individual plants can enter the planting belts.

Referring now to the transplanter head H which comprises triangular shaped side members 125 and 126, which are practically identical in construction, and a description of but one will suffice for both. This head assembly is constructed from two plates, which when viewed from the side, are substantially triangular in shape, and are connected to the upper and lower frame members 28 and 29, respectively. The transplanting head assembly includes a plate 127 on which the top rear pulley bracket 128 and bearing assembly 129 is mounted. A stub shaft 130 is journaled in the bearing 129 and a rear pulley 131 is mounted on said shaft and over which the planting belts 54 are trained.

Figure 20:
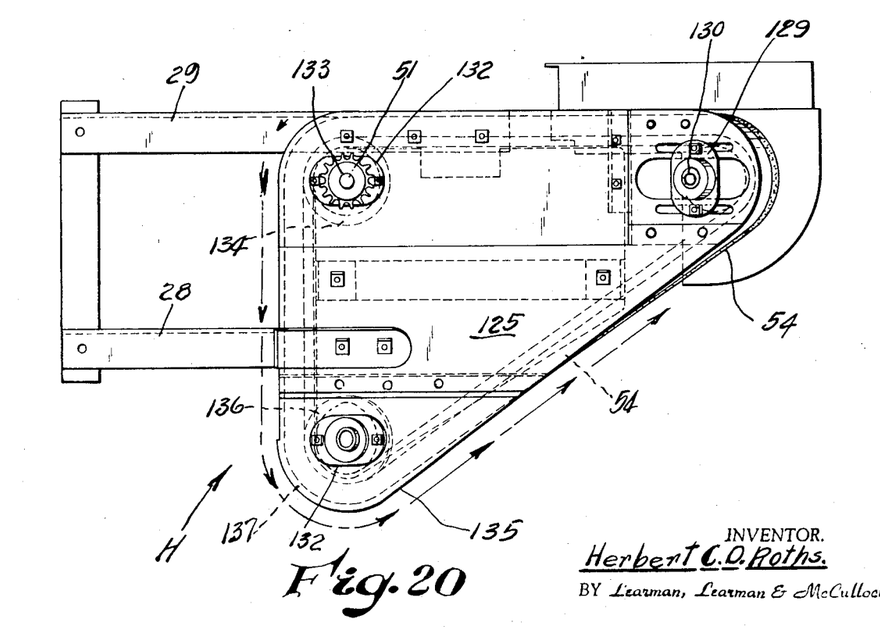
FIG. 20 is a side elevational view of the planting head.
Figure 21:
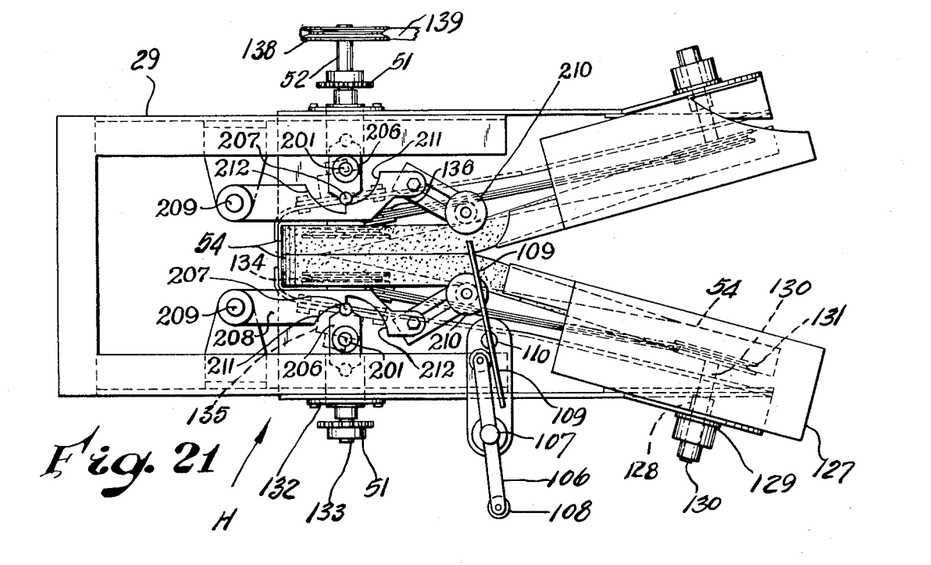
FIG. 21 is a top plan view thereof.
Figure 22:
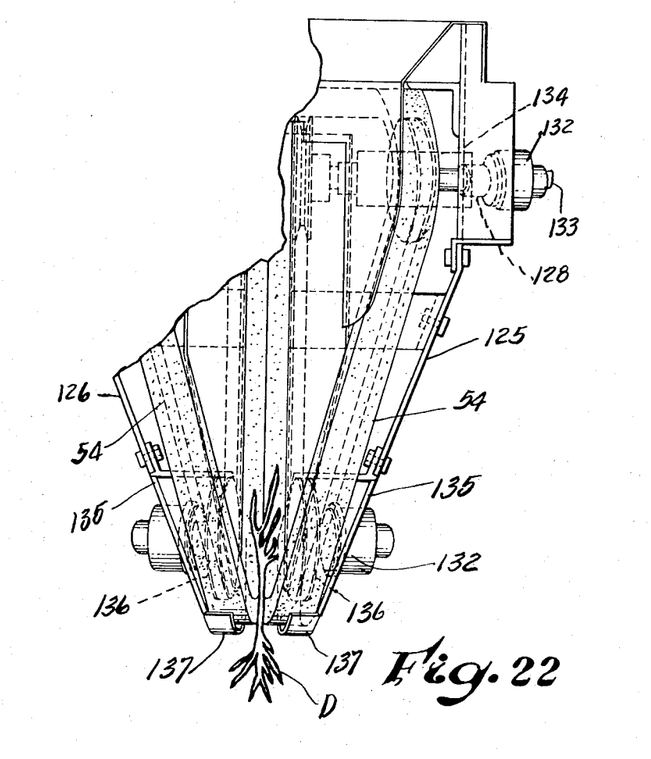
FIG. 22 is a fragmentary front elevational view of the planting head.
Figures 23, 24:
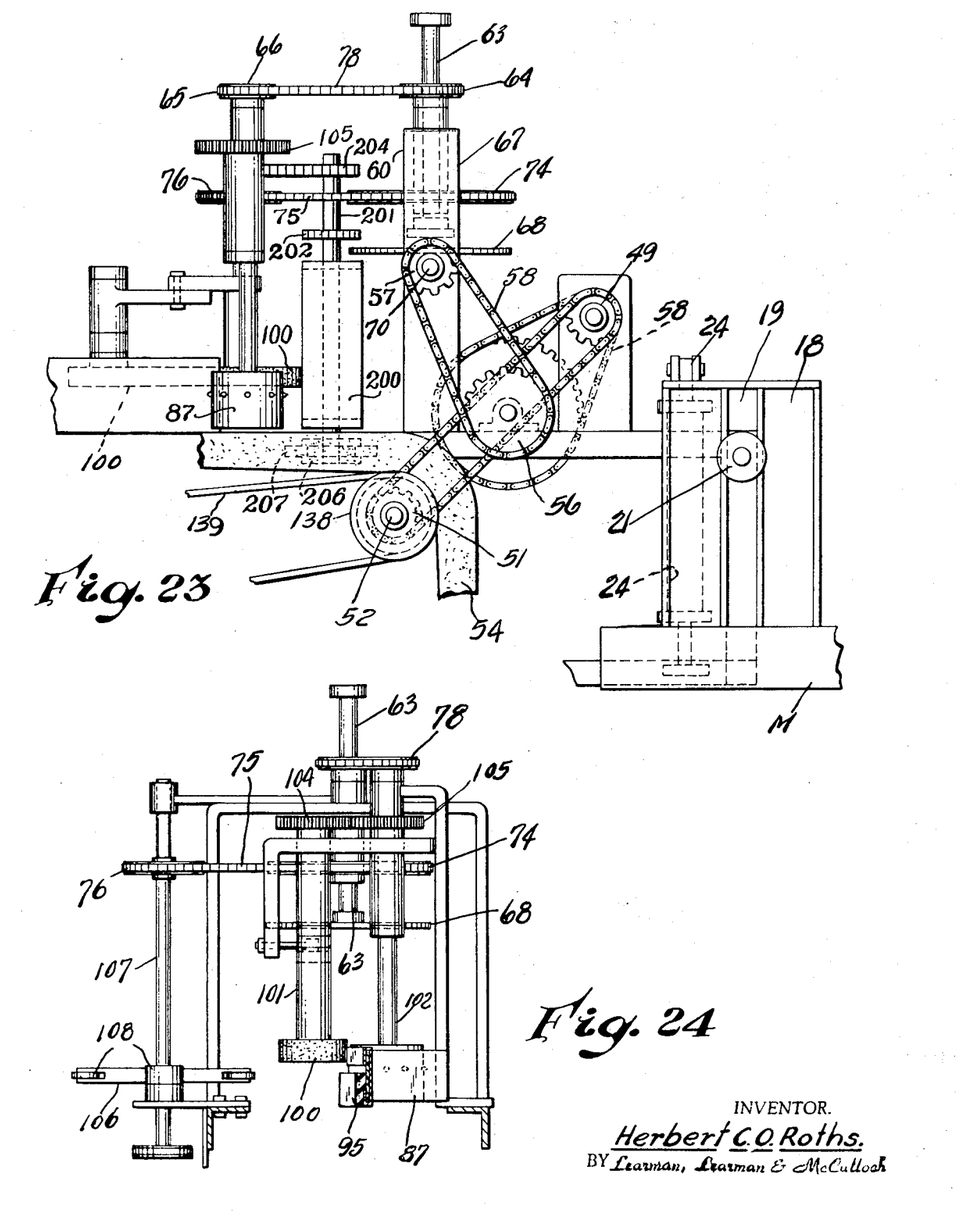
FIG. 23 is an enlarged side elevational view of the planting machine driving mechanism.
FIG. 24 is a fragmentary front elevational view showing the drive for the holding belt and magazine rewind means, etc.

The bracket 128 (FIGS. 20-22 is made angular to the side plate 125 to accurately guide the travel of the planting belts 54. In the front, and at the top of the planting head, a flanged bearing assembly 132 is used, and a stub shaft 133 is journaled in said bearing with a Vee pulley 134 mounted thereon, said shaft projecting beyond the side plates of the head to accommodate the sprockets 51 by means of which the planting belts 54 are driven. The planting head drive assembly drives all the powered and moving parts used for the transplanting mechanism. An offset bracket 135 is provided on the front lower end of the side plates 125 and 126, and a bearing assembly 132 is mounted thereon, said assembly including a ground pulley 136 and guard 137 mounted thereon to give parallel and angular travel to the planting belts. It will be noted that there is a space between the inside flanges of the pulleys 134 equalling the width of the two planting belts 54, and at this point the adjacent edges of the planting belts must be closed and bear on each other to yieldably hold the transplants being conveyed to the next set of pulleys. The two top sprockets 51 drive the front top planting belts to give parallel and angular travel to said belts. The ground pulley 136 and bracket guard 137 are secured to the assembly side plates 125 and 126 and are in their proper alignment when attached to the upper portion of the frame of transplanting head 125, and the lower frame of transplanting head 126, and the assembled pattern of the side plates is wide at the top to allow clearances for feeding the transplants into a wide throat at the beginning of the transplanting travel, and narrow at the bottom to enable the packer wheels 23 to be set closer to the discharge point of the transplants at the end of the transplanting cycle.

The vertically disposed guide roller 210 provided on each section of the head assembly is spaced from the front end thereof, said rollers serving to guide the planting belts 54 into edge to edge yielding contact with each other to carry the transplants D therebetween when the machine is in operation.

The shaft 52 on the one front bearing assembly has a magazine rewind pulley 138 mounted thereon, and a belt 139 drivingly connects pulley 138 with a slip clutch pulley 140 for driving the rewind table R. An inner shield 141 is provided on the side plates 127 at a point intermediate their length to prevent plant leaves getting into the wheel.

The furrow opening shoe assembly 22 is of simple design and includes a flat draw bar 142 having a bolt opening 143 therein and a pair of bolts 144 in the beam assembly to provide for independent depth adjustment, plus either forward or backward space adjustment.

Figures 26, 27, 28:
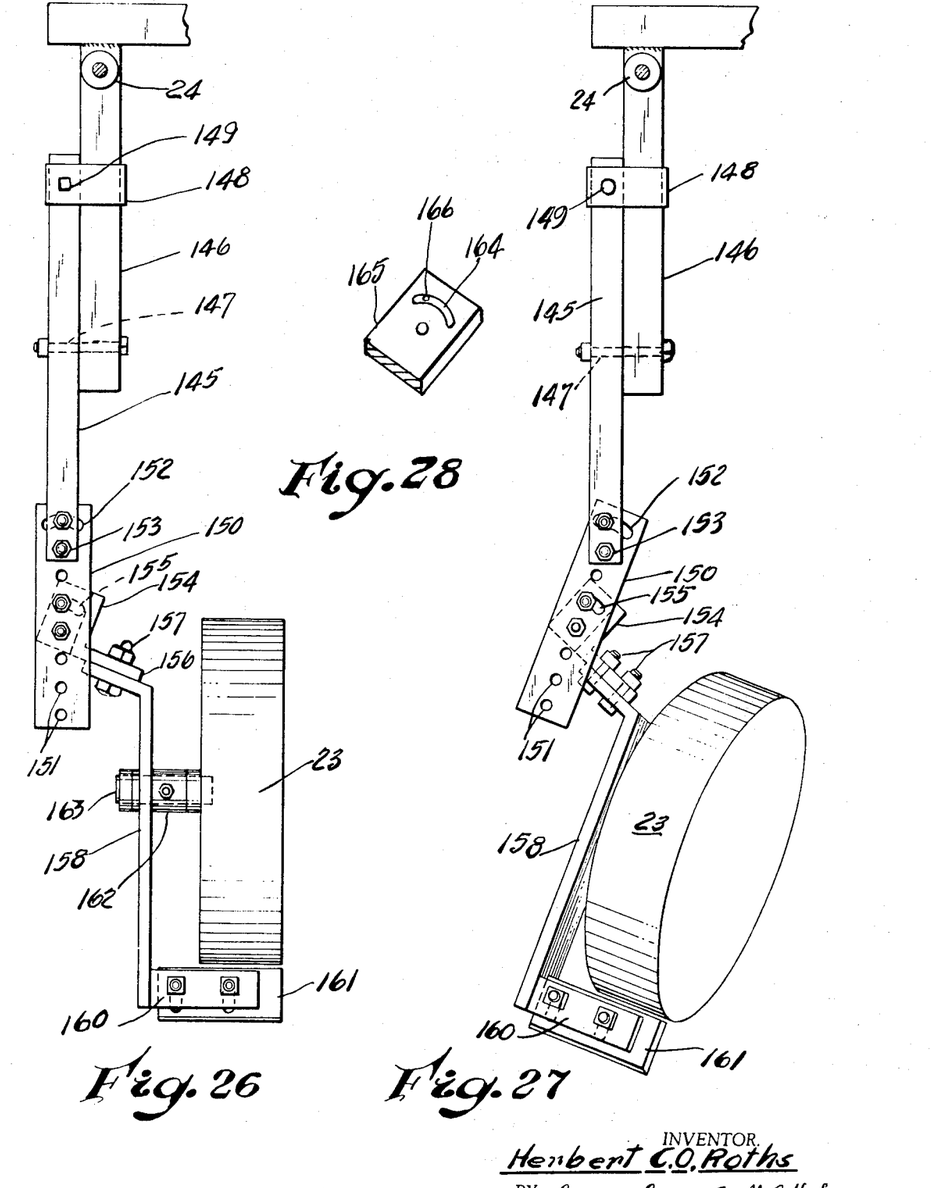
FIG. 26 is a top plan view of one of the packer wheels.
FIG. 27 is a similar view showing the adjustability of the wheel.
FIG. 28 is a fragmentary face view of the swivel plate bracket to provide adjustment of the packer wheels.

Referring now to the packer wheels 23, shown in FIGS. 26 and 27 of the drawings, said wheel being used only for cascading the soil into the open furrow and packing the cascaded soil as the machine travels. The packer wheel assembly (FIGS. 26-28) includes an adjustable arm 145 disposed in facial contact with a parallel horizontally disposed arm 146 connected to one cylinder 24 of the hydraulic system 25. A bolt opening 147 is provided in the leg 146 at which point it attaches to the transplanter, and a clamp 148 is mounted on the legs 145 and 146 with a set screw 149 to hold the parts in assembled relation.

One end of the adjustable arm 145 is connected to a linkage bar 150 having a pair of connections at its point of attachment, said linkage bar having a plurality of spaced apart openings 151, and a radial slot 152 to provide for rotation of said arm with relation to the linkage bar, and nuts 153 clamp the linkage in selected position.

The swivel plate bracket 154 is connected to the linkage bar 150, and is provided with radial slot 155 which permits backward and forward adjustment of the packer wheel. The swivel plate bracket 154 is right angled in shape and has a right angle leg 156 at one side of the angle leg which provides for clamping one leg in a vertical plane, and the opposite leg in a horizontal plane by bolts 157 so that both vertical and horizontal adjustment can be made. A bearing arm 158 is secured to the leg 156 by means of bolts (not shown).

A laterally projecting angularly disposed leg 160 is provided on the free end of the bearing arm 158 and a scraper blade 161 is mounted on said arm in any desired manner to clean sticky soil from the packer wheel. A bearing 162 is secured to the bearing arm 158 in which the shaft 163 of the packer wheel rotates, said wheel being held in position by means of collars, as shown.

The assembly can be adjusted to readily tilt the wheel 23 (shown in FIG. 27 of the drawings) a radial slot 164 being provided in the face of the leg 156 and bolts 165 are provided for clamping the sections 156 and end of the bearing leg in position, the slot permitting the wheel 23 to be swung with relation to the plate bracket 154 to provide any reasonable tilt movement which is then held in set position by means of the bolts 166.

In operation, the packer wheel assembly has a number of adjustments to suit various soils, and the depth and firmness that is desired to pack the soil is obtained by adjusting set screws to transfer the soil into the open furrow to support the transplant as it is being released. The soil can be made to flow to the desired position by adjusting the swivel plate bracket 154 to obtain a flat pattern of packing or a Vee groove. The wheels can be angled or tilted by the use of the swivel bracket to adjust the edge of the packing wheel in relation to the transplanted plant and the linkage bar 150 is used to swing the wheel either inward or outward.

In practice, a filled magazine in which the transplants D are carried is first loaded on the shaft 91 of the machine. The free end of the magazine is then hand drawn through the transplant conveyor J, and is connected to the rewinding spool S for rewind as the individual transplants are released. The transplants are held in perpendicular position at all times, and when completely released by the magazine belt are fed to the planting belts 54 and are carried to the point of release in a furrow, after which a water valve 167 discharges a predetermined volume of water to the roots of each plant as it is planted, and the packer wheels force the ground into the furrow around the plant, continuously packing the ground accordingly. As the machine is operated and the loaded section of the magazine nears the end of its length, an alarm (not shown) is sounded to indicate to the operator that a fresh filled magazine is required. It is, of course, understood that the spent magazine is again loaded with transplants, either for immediate use or placed in the tank T for later use, as previously described.

Since many different modifications of the present invention are possible, it will be realized that the foregoing specific embodiment has been shown and described only for the purpose of illustrating the principles of the invention and is subject to extensive changes.

I claim:

1. A planting machine for planting transplants comprising: a mobile frame; a coilable magazine journaled on said frame; means for moving said magazine on said frame to a transplant discharge station; said magazine including a resilient strip mounted on one edge thereof and formed with a plurality of transplant accommodating pockets in said strip; angularly disposed slits in said strip and leading to said pockets; means on said frame over which said magazine is traveled to open said pockets and discharge the transplants therefrom as the machine is operated; resilient feed means located adjacent said pocket opening means for retaining the transplants in proper position; a planting head comprising a pair of spaced frame members; and a pair of parallel belts formed of spongy yieldable material mounted on said frame members for yieldably receiving said transplants from said resilient feed means and carrying the transplants and discharging them into a furrow in the ground as the machine is operated, the combination further including a feed timing plate positively connected to the means for moving the magazine to control the rate of travel therethrough.

2. The combination defined in claim 1 in which the magazine is formed with linear spaced apart openings therein, and wherein said pocket opening means is a toothed feed roller meshing with the openings in the magazine.

3. The combination defined in claim 1 in which said resilient feed means comprises a continuous adjustably mounted holding belt assembly mounted on the frame for yielding engagement with said magazine and in timed relation with the travel thereof for receiving said transplants from said pockets.

4. The combination defined in claim 1 in which the planting head comprises individually driven sections, each section being provided with a driven belt, said sections sharply diverging from each other at a predetermined point of travel to release said transplant into a furrow in the ground as the machine is operated.

5. A planting machine for handling transplants comprising: a mobile frame; a plant loaded magazine; planting belt means mounted on said frame and comprising a pair of side-by-side convergent resilient endless belts having parallel engaging portions between which the plants are gripped; means for opening and closing sections of said parallel engaging portions alternately for receiving and gripping plants therebetween, respectively; said belts having a downward path of travel leading to a position of adjacency with the ground and diverging at said position to release the plants; and means for transferring plants from said magazine to said parallel engaging portions at a time when said parallel engaging sections are opened including means for grasping the plants when they have been released from said magazine means to prevent their free fall during the transfer to said parallel engaging portions.

6. The combination defined in claim 5 in which said side by side resilient belts are normally biased to diverge and said means for opening and closing said parallel engaging sections includes a pair of pivotally mounted arms extending along each of said parallel engaging portions and having cam follower surfaces thereon; and rotary cam means mounted to rotate about generally vertical axes adjacent said arms in position to alternately move said arms toward one another to squeeze another to close said sections of the belts and permit said arms to be moved outwardly by the tendency of said sections of the belts to return to a more diverged position.

7. The combination defined in claim 5 in which plant retarding means, movable from a position across said parallel engaging portions of the belt means above and below said planting belt means in which it blocks the path of a plant proceeding between said planting belt engaging portions, is withdrawable to a non-blocking position; and means is provided operating in timed relation with said means for opening and closing said planting belt sections for withdrawing and returning said plant retarding means.

8. The combination defined in claim 7 in which said plant retarding means is withdrawn at substantially the time said planting belt sections are closed.

9. The combination defined in claim 8 in which said plant retarding means comprises a generally horizontal bar mounted to pivot on a generally vertical axis beyond which it extends at both ends; and said means for withdrawing and returning said plant retarding means comprises rotary means for engaging the end of said bar remote from the planting belt means and alternately moving it between plant retarding position and withdrawn position in which the plant is respectively held in upright position and released.

10. A planting machine for handling transplants comprising: a mobile frame; a plant loaded magazine; means for receiving said plant loaded magazine; planting belt means comprising a pair of side-by-side convergent resilient endless members having parallel engaging portions between which the plants are gripped; plant retarding means, movable from a position across the confluence of said engaging portions in which it blocks the path of a plant proceeding between said endless members, withdrawable to a non-blocking position; means for alternately withdrawing and returning said plant retarding means; said endless members having a path of travel leading to a position of adjacency with the ground and diverging at said position to release the plants; and means for transferring plants from said magazine to said parallel engaging portions.

11. A planting machine for handling transplants comprising: a mobile frame; a plant loaded magazine mounted on said frame; gripping means mounted on said frame and having parallel engaging portions between which the plants are gripped; means for opening and closing sections of said parallel engaging portions alternately for receiving and gripping plants therebetween, respectively; said gripping means having a downward path of travel leading to a position of adjacency with the ground and diverging at said position to release the plants; and means for transferring plants from said magazine to said parallel engaging portions at a time when said parallel engaging sections are opened including means for grasping the plants when they have been released from said magazine to prevent their free fall during their transfer to said parallel engaging portions.

* * * * *